US007317791B2

(12) United States Patent
Carlson

(10) Patent No.: US 7,317,791 B2
(45) Date of Patent: Jan. 8, 2008

(54) APPARATUS AND METHOD FOR CONTROLLING CONFERENCE CALL PARTICIPANTS

(75) Inventor: Michael Pierre Carlson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/216,343

(22) Filed: Aug. 8, 2002

(65) Prior Publication Data

US 2004/0028199 A1 Feb. 12, 2004

(51) Int. Cl.
*H04M 7/00* (2006.01)
*H04M 1/00* (2006.01)
*H04M 11/00* (2006.01)

(52) U.S. Cl. ............... 379/202.01; 379/158; 379/93.23

(58) Field of Classification Search ........... 379/202.01, 379/203.01, 204.01, 205.01, 206.01, 207.01, 379/207.13, 190, 207.02, 158, 93.21, 93.23
See application file for complete search history.

(56) References Cited

U.S. PATENT DOCUMENTS 5,450,481 A 9/1995 Penzias ...................... 379/202
5,668,863 A 9/1997 Bieselin et al. ............. 379/202
6,178,237 B1 * 1/2001 Horn .......................... 379/202
6,201,859 B1 * 3/2001 Memhard et al. ........ 379/93.21
6,236,854 B1 5/2001 Bradshaw, Jr. .............. 455/416
6,282,278 B1 8/2001 Doganata et al. ........... 379/202
6,304,648 B1 10/2001 Chang ................... 379/202.01
6,687,353 B1 * 2/2004 Brysch et al. .............. 379/189
2001/0002927 A1 * 6/2001 Detampel, Jr. et al.
2003/0161456 A1 * 8/2003 Brown et al.
2003/0194072 A1 * 10/2003 MacNamara et al.
2004/0006595 A1 * 1/2004 Yeh et al.
2004/0137882 A1 * 7/2004 Forsyth

FOREIGN PATENT DOCUMENTS

DE 102 24 905 * 2/2003

* cited by examiner

*Primary Examiner*—William J. Deane, Jr.
(74) *Attorney, Agent, or Firm*—David A. Mims, Jr.; Rudolf O. Siegesmund; Gordon & Rees, LLP

(57) ABSTRACT

The present invention, which meets the needs identified above, is an apparatus and method of controlling a conference call using an improvement on the conference calling center's computer software. The control program allows the host of a conference call to selectively control the dissemination of information between conference call participants. The control program allows the host to designate other hosts, create private meetings among conference call participants, mute any number of participants in relation to each other, or completely exclude participants. The participants may also send messages to other participants or the host using the present invention. A control screen is disclosed that allows the user to direct the flow of information among participants. A connection screen is also disclosed to further assist the host in determining the appropriate flow of information between participants.

37 Claims, 5 Drawing Sheets

APPARATUS AND METHOD FOR CONTROLLING CONFERENCE CALL PARTICIPANTS

CROSS-REFERENCE TO RELATED APPLICATIONS

The present invention is related to the subject matter of U.S. patent application Ser. No. 10/216,493, incorporated herein by reference.

FIELD OF THE INVENTION

The present invention relates generally to the field of telephone conference calls, and specifically to the field of controlling the participants of a conference call.

BACKGROUND OF THE INVENTION

Today's business travelers have almost continuous access to either a cellular or a conventional telephone in any given stage of travel. The telephone is often the most convenient and efficient method of communication between the business travelers and their clients. Frequently, traveling business people also need to collaborate with the home organization and with clients, vendors, and business partners. The conference call has developed into a useful tool in forming these collaborative sessions.

As convenient as a conference call is, conference calls still contain a number of disadvantages over conventional conferences. One of these disadvantages is identifying who is participating in a conference call. Another disadvantage is controlling the attending parties of a conference call. Perhaps the largest disadvantage of a conference call is that the parties cannot break into smaller groups to have private meetings to discuss proposals made during the conference call. In mediation and arbitration settings these private sessions are frequently necessary. Therefore, given the existing state of the art, conference calls are not practical for many arbitration and mediation sessions.

Many inventions have been directed towards improving conference calls. However, most center on a method or apparatus for identifying the parties involved in a conference call. Relatively few, if any, address the problem of controlling the flow of information between attending parties. Therefore, a need exist for an invention which is able to control the flow of information between parties during a conference call. A need also exists for a graphical method of identifying and controlling the attributes of the individual conference call participants.

SUMMARY OF THE INVENTION

The present invention, which meets the needs identified above, is an apparatus and method of controlling a conference call using an improvement on the conference calling center's computer software. The control program allows the host of a conference call to selectively control the dissemination of information between conference call participants. The control program allows the host to designate other hosts, create private meetings among conference call participants, mute any number of participants in relation to each other, or completely exclude participants. The participants may also send messages to other participants or the host using the present invention. A control screen is disclosed that allows the user to direct the flow of information among participants. A connection screen is also disclosed to further assist the host in determining the appropriate flow of information between participants.

DETAILED DESCRIPTION OF THE PREFERRED EMBODIMENT

As used herein, the term "conference call" means a gathering of people for communicative purposes. Most conference calls involve a third party conference calling center which issues a telephone number and a passcode to all the conference call participants (the host and the callers). The participants call the telephone number at the appropriate time, enter the passcode, and the conference calling center connects the participants. As used herein, the term "host" means the leader of a conference call. The host is usually the person who decides the date, time, and other details of the conference call, but is not limited as such. As used herein, the term "participant" means a person who is involved in a conference call. The host will always be one of the participants of a conference call. As used herein, the term "conference call center" means a third party who allows the participants of a conference call to be connected to one another. Conference call centers typically have an automated menu for setting up and connecting to a conference call. As used herein, the term "attribute" means any of the controllable functions in an automated menu pertaining to a participant. Examples of attributes are full or partial muting, full or partial exclusion, and full or partial host capabilities.

Figure 1:
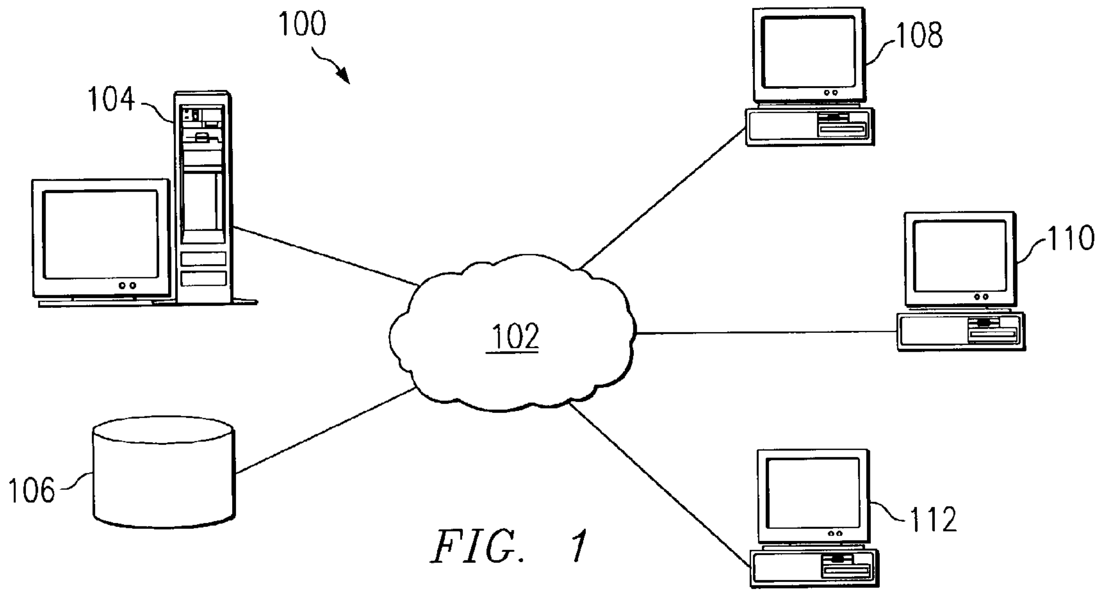
FIG. 1 is an illustration of a distributed data network.

FIG. 1 depicts a pictorial representation of a distributed data processing system in which the present invention may be implemented and is intended as an example, and not as an architectural limitation for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
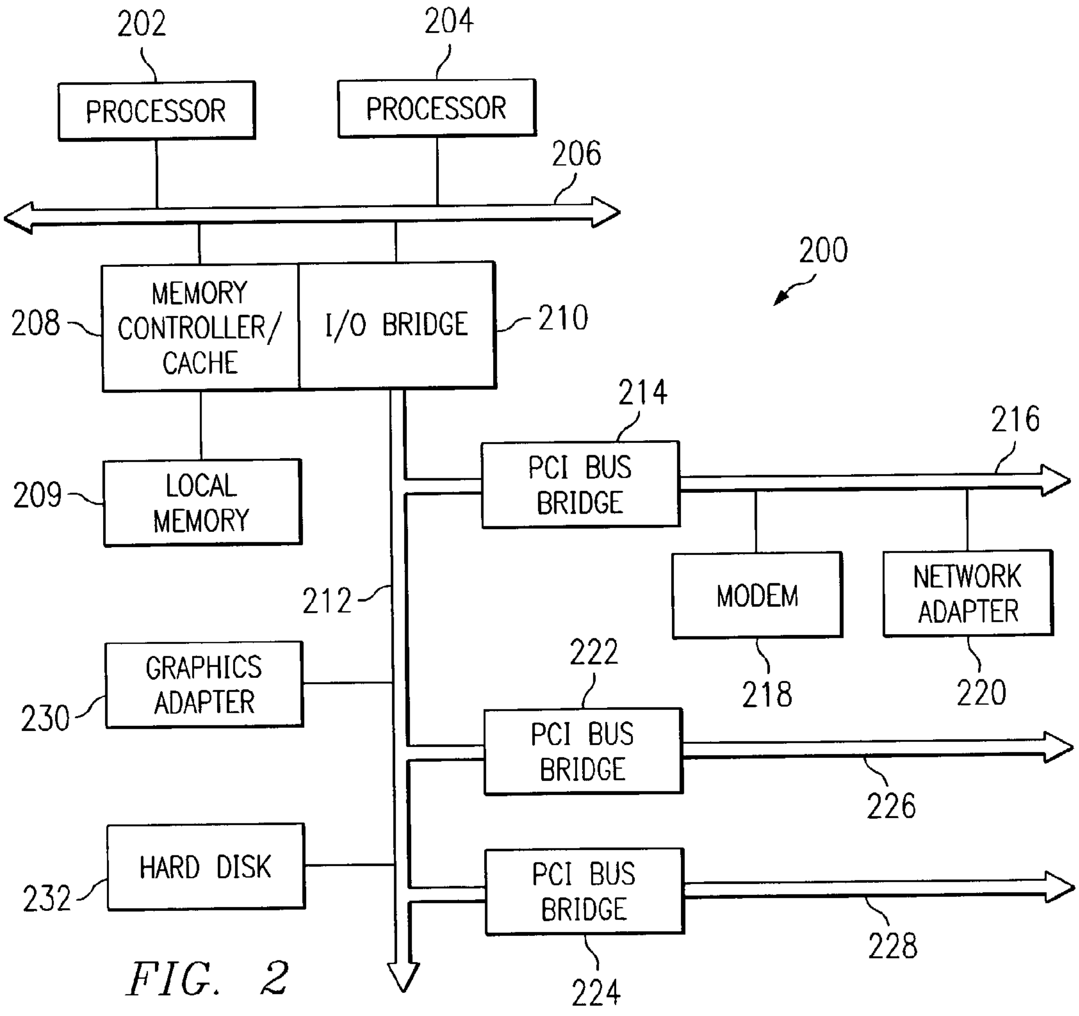
FIG. 2 is an illustration of a data processing system.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
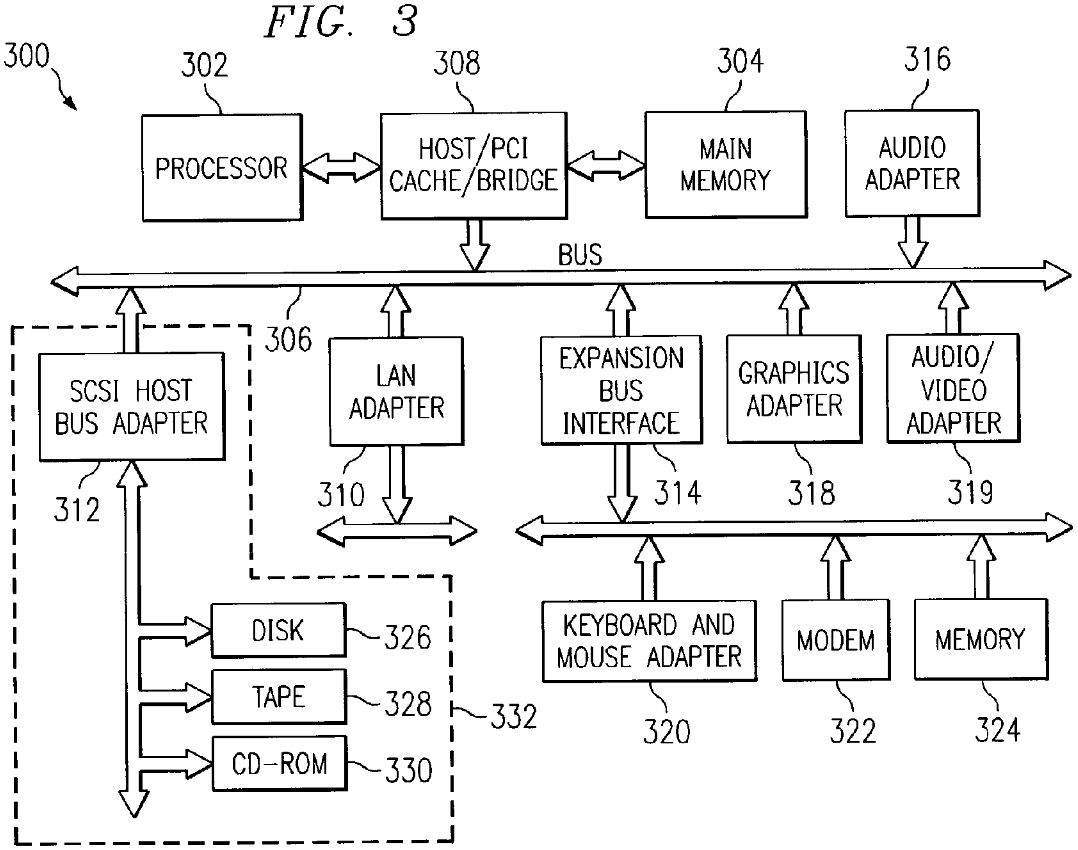
FIG. 3 is an illustration of a data processing system.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 arid main memory 304 are connected to PCI local bus 306 through PCI bridge 308. PCI bridge 303 also may include an integrated memory controller and cache memory for Processor 302. Additional connections to PCI local bus 306 may be made through direct component interconnection or through add-in boards. In the depicted example, local area network (LAN) adapter 310. SCSI host bus adapter 312. and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2. which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 3011, "Java" is a trademark of Sun Microsystems, Incorporated. Instructions for the operating system. the object-oriented operating system, and applications or programs may be located on storage devices, such as hard disk drive 326, and they may he loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Modern telecommunications systems are almost inseparable from their computer components and the Internet. Accordingly, those skilled in the art are aware of how to configure a conference calling center's automated system with additional components such as the programs contained within the present invention. The present invention encompasses the concept of disabling the transmission and reception of audio signals. Those skilled in the art are aware of how to selectively disable the transmission and reception of audio signals on a telephone or similar device. The present invention is also applicable to video conference calls as well as audio conference calls.

In entering information into control program 400, the information may be entered by speaking into the handset of a telephone, entered via the touchpad of a telephone, entered over the Internet, or by any other data entry method. Those skilled in the art are aware of how to configure a computer to receive information over the Internet. Those skilled in the art are also aware of how to configure a telephone system to accept user input via telephone keypads and audible voice signals. Furthermore, the steps embodied in control program 400 are not necessarily limited to the order as presented herein.

Figure 4:
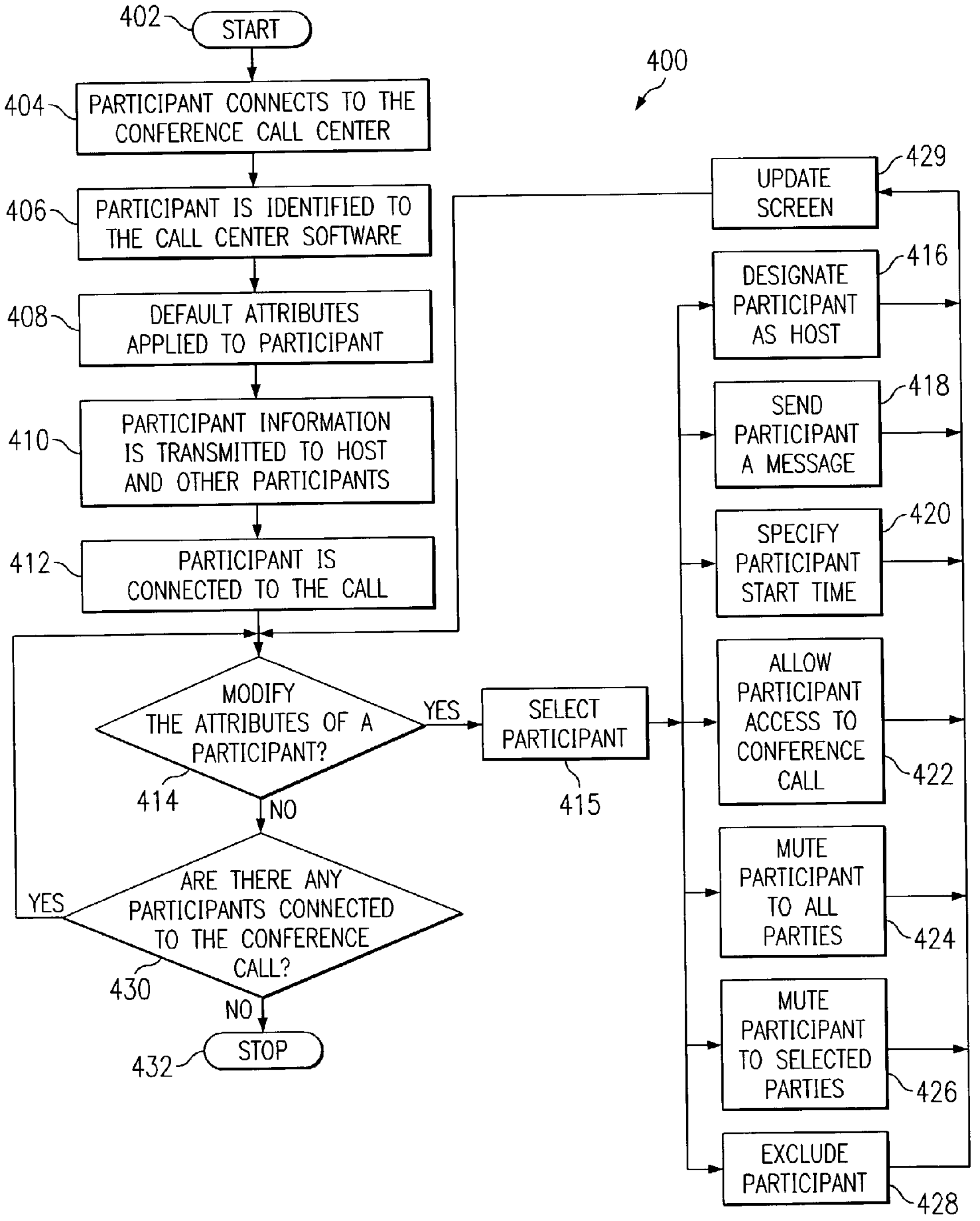
FIG. 4 is an illustration of the logic behind the control program.

FIG. 4 is an illustration of the logic behind control program 400. Control program 400 connects the participants to the conference call and allows the host of the conference call to control the participants. Control program 400 starts (402) when the first participant connects to the conference call center (404). When the participants connect to the conference calling center, the participants are usually required to enter a call number and passcode. However, the participants can also connect to the conference call by operator assistance. The first participant to connect to the conference call center is usually the host, but connection of any of the participants will begin control program 400. When each participant connects to the conference call center, control program 400 identifies the participant using the conference call center software (406). In identifying the participant, control program 400 can use caller ID, user entered ID, operator assistance, an identifying device, or the method disclosed in U.S. patent application Ser. No. 10/216,493. Control program 400 then applies the default attributes to the participant (408). When the host sets up the conference call, he specifies the time, number of participants, and the default attributes of each participant. These default attributes can be one or more of the attributes discussed in conjunction with steps 416 through 428, which are:

1. Designate the participant as the conference call host.
2. Send a message to the participant.
3. Specify the participant start time.
4. Allow the participant to connect to the conference call.
5. Mute the participant to all of the participants.
6. Mute the participant to selected participants.
7. Exclude the participant until authorized by the host.

The participant information and attributes are then transmitted to host and other participants (410). In certain circumstances, the host may desire to limit the participant information to the host and/or a selected group of participants. In this case, the host may choose to only have the participant status information transmitted to himself and/or a selected group of participants. The transmission of information is received by the other participants through the Internet, by multiplexing the data along the telephone line with the audio signal of the participants, or any other method as determined by those skilled in the art. The host and other participants receive the participant information and attributes on a graphical user interface such as a personal computer 502, modified telephone 504, or control device 510 connected to the telephone. Examples of these devices can be seen in FIGS. 5A, 5B, and 5C. Control program 400 continuously updates the status information sent to the host and other participants until the conference call ends.

The participant is then either immediately connected to the conference call or, if the participant is restricted from joining the conference call, he is placed on hold until the restriction requirement is met at which point the participant is then connected to the conference call (412). As the conference call progresses, the host may desire to change the attributes of one or more of the conference call participants (414). If the host desires to change the attributes of one of the participants, then the host selects the participant (415) and selects one of options 416 though 428.

The first option is to designate the participant as the conference call host (416). In certain circumstances, the party acting as host for the purposes of setting up the conference call may not necessarily be the same party who will be the host during the conference call. This is usually the case when a secretary or junior member of an organization is setting up the conference call, but a more senior member of the organization will be the host during the conference call. In this case, the host for the purposes of setting up the conference call can designate another party to be host when the conference call starts. Additionally, the participants may want more than one party to have the host's power (i.e. to mute or exclude other participants). In this case, a plurality of participants can be designated as hosts. Conflicting commands between hosts can be resolved by a variety of different means and is best determined by those skilled in the art.

The second option is to send the participant a message (418). The host may send one or more of the participants a message as text on a graphical user interface or as an email. If this is the ease, the host enters a message and sends it to the appropriate participant. The participants can also send messages to each other using control program 400. This is particularly useful when one or a group of participants are excluded from the conference call and desire to express the readiness to be connected to the conference call without disrupting the flow of the conference call.

The third option is to specify the participant's start time (420). In some circumstances, it may be desirable to exclude the participant from the conference call until a certain point or time. In these instances, the present option is appropriate. The host can set a specific time (i.e. 3:30EST) for the participant to join into the conference call. Thc participant is then excluded from the conference call until the appropriate time. The host can allow the participant in early by selecting the option under step 422.

The fourth option is to allow participant access to the conference call (422). When the host is ready to allow the participant who was excluded (under step 428 or possibly step 420) access to the conference call, he selects this option. The participant will then be connected to the conference call.

The fifth option is to mute the participant to all of the participants (424). In some circumstances, it may be desirable for the participant to eavesdrop on the conference call. In other words, the participant can hear the conference call but is not allowed to speak during the conference call. This a useful option when a secretary is taking notes during a conference call and the other participants do not want to hear the secretary typing. In this option, the host can either mute the participant for the entire conference call, or indicate when the participant is to be muted by use of a key on a touch tone telephone, the Internet, by voice, or any other means preferable to the host.

The sixth option is to mute participant to selected participants (426). The host can mute the selected participant with respect to any number of participants. This is a useful option if the host wants to be able to hear the muted participant, but does not want any of the other participants to hear the muted participant. The host can either mute the participant to the other participants for the entire conference call, or indicate when the participant is to be muted by use of a key on a touch tone telephone, the Internet, by voice, or any other means preferable to the host.

The seventh option is to exclude the participant (428). In certain circumstances, it is desirable to exclude a conference call participant from the conference call for a given amount of time. This is useful in negotiation settings where the host is a representative of one of a plurality of parties attending a conference call and would like to confer with his client alone. It is also useful in mediation and arbitration settings where the host is the arbitrator or mediator and needs to talk to each party alone at different points throughout the conference call. In this option, the host can indicate when the participant is to be excluded by use of a key on a touch tone telephone, the Internet, by voice, or any other means preferable to the host.

The host can exclude a number of participants with respect to the conference call, but allow them to communicate with each other. In this manner, private sessions among participants are possible. After the participants have been excluded, they can express their readiness to reconnect to the conference call by using the message function discussed in conjunction with step 418.

After the host selects one of options 416 through 428, control program 400 updates the screen of the host's graphical user interface as well as the graphical user interfaces of participants with access to the modified area (429) and returns to step 414. If at step 414 the host decides that he does not desire to modify any of the attributes of any of the participants, then control program 400 makes a determination of whether there are any participants still connected to the conference call (430). If there are still some participants connected, the control program 400 returns to step 414. If there are no longer any participants connected to the conference call, then control program 400 ends (432).

Figure 5B:
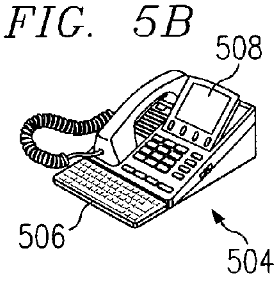
FIG. 5B is an illustration of a modified telephone.
Figure 5A:
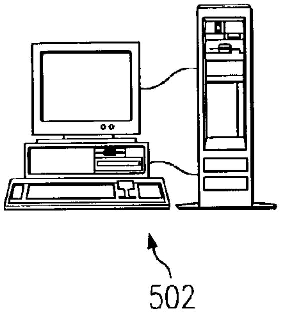
FIG. 5A is an illustration of a personal computer.
Figure 5C:
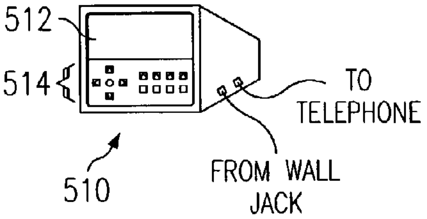
FIG. 5C is an illustration of a control device.

FIGS. 5A, 5B, and 5C are illustrations of apparatuses that can be used to display information related to control program 400 on a graphical user interface. FIG. 5A is an illustration of personal computer 502. Personal computer 502 may be similar to the circuitry described in accordance with FIGS. 1 through 3. FIG. 5B is an illustration of modified telephone 504. Modified telephone 504 contains user input keys 506 and display screen 508. Modified telephone 504 may also contain some of the circuitry described in accordance with FIGS. 1 through 3. FIG. 5C is an illustration of control device 510. Control device 510 contains user input keys 514 and display screen 512. Control device is useful in embodying the present invention with a conventional telephone when a personal computer is unavailable. Control device 510 may also contain some of the circuitry described in accordance with FIGS. 1 through 3.

The present invention is an improvement on existing conference call center software. The present invention is preferable over existing devices because it allows the host of a conference call to control the dynamics of the conference call. The present invention also allows the host of a conference call to selectively exclude certain participants of the conference call. As such, the present invention will be located in the memory of the system in which the conference call center's conference call computer program is located.

Figure 6:
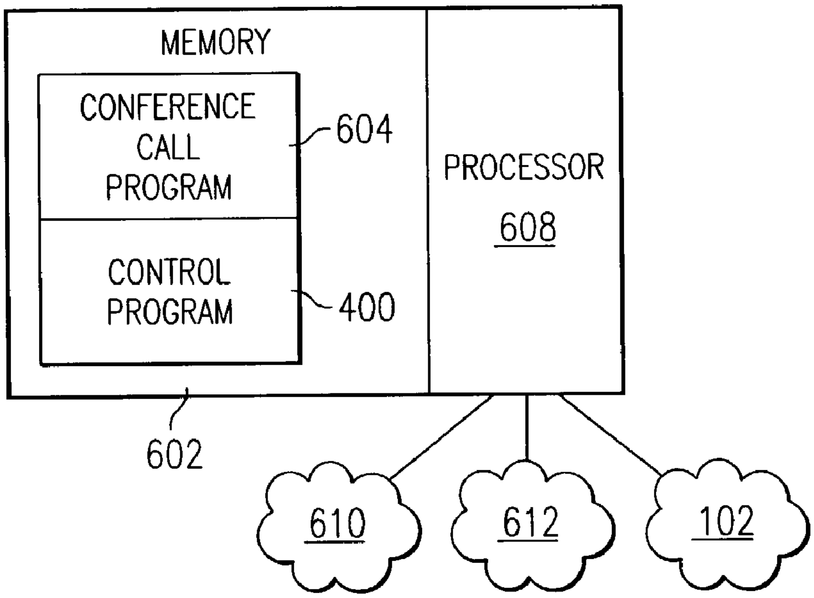
FIG. 6 is an illustration of the present invention embodied within the conference call center's computer.

FIG. 6 is an illustration of the memory 602 of the system on which the conference call center's conference call program 604 is implemented. Control program 400 is an addition to conference call program 604. Memory 602 is a storage facility for data for processor 608. Processor 608 can interface with cellular networks 610, traditional non-cellular networks 612, or the Internet 102. Memory 602 and processor 608 can be a part of a system of a cellular service provider, a traditional non-cellular telecommunications system, or any other system which contains a conference call center's conference call program.

Figure 7:
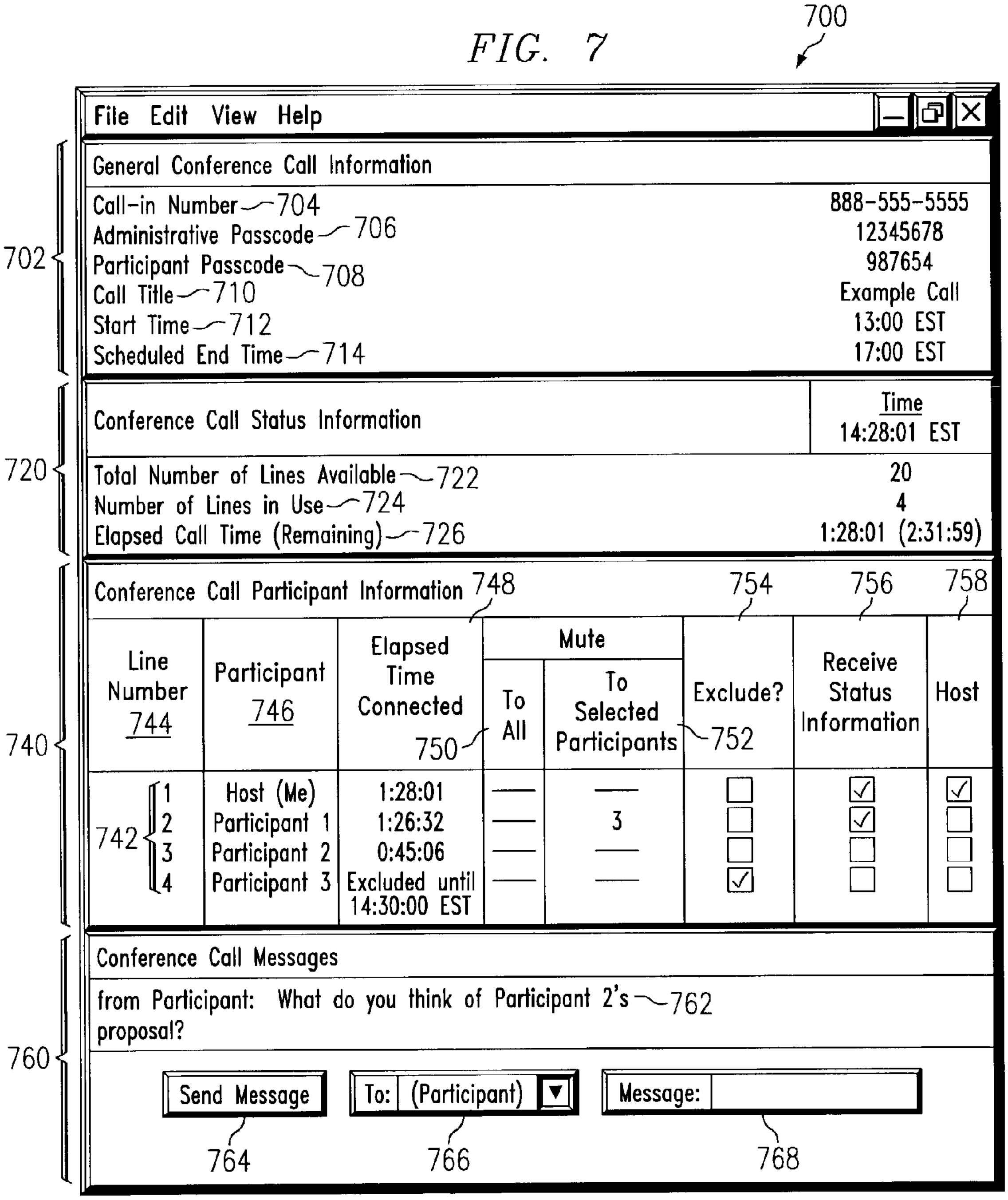
FIG. 7 is an illustration of the control screen of the present invention.

FIG. 7 is an example of a screen produced on a graphical user interface in accordance with control program 400. Control screen 700 is comprised of four sections: general information section 702, status information section 720, participant information section 740, and message section 760. Control screen 700 will be available to all of the conference call participants, but the host may limit the amount of information which is disseminated to the individual participants on their individual control screens 700. At the minimum, each participant will have access to message section 760.

The first section, general information section 702, contains information which is relevant to the conference call and will remain fixed for the duration of the conference call. This includes, but is not limited to, information such as call in number 704, administrative passcode 706, participant passcode 708, call title 710, start time 712, and scheduled end time of the call 714.

The second section of information on control screen 700 is status information section 720. Status information section 720 displays information which is relevant to the conference call and will change during the course of the conference call. This includes, but is not limited to, information such as the total number of conference call lines available 722, the number of conference call lines in use 724, and the elapsed time of the call 726.

The third section of information on control screen 700 is participant information section 740. Participant information section 740 contains information regarding each of the participants and their attributes. The information in participant information section 740 is arranged into rows and columns, with each row relating to a specific participant and each column relating to different attributes of the participants. In the example in FIG. 7, there are four participants 742. Control screen 700 shows what line each participant is connected to 744, the participant's name 746, and the elapsed time each participant is connected to the conference call 748. The host can mute the participant to all of the participants 750 or only to a select number of participants 752. The host may also exclude a participant from the conference call 754. allow the participant's graphical user interface to display the same information that the host's control screen 700 displays 756, and indicate who is to be the host of the conference call 758.

The fourth section of information on control screen 700 is message section 760. Message section 760 allows the host and other allowed participants to send written messages to other participants. Message section 760 contains message screen 762, send button 764, recipient drop-down menu 766, and message data entry field 768. To send a message to a participant, the host chooses a participant from the recipient drop-down menu 766, types the message into message data entry field 768, and clicks the send button 764. Messages sent by the host and messages to the host from other participants are displayed on message screen 762. Alternatively, the message may be sent to the recipient via email. Email is a particularly attractive option when the recipient is not allowed to view control screen 700.

Figure 8:
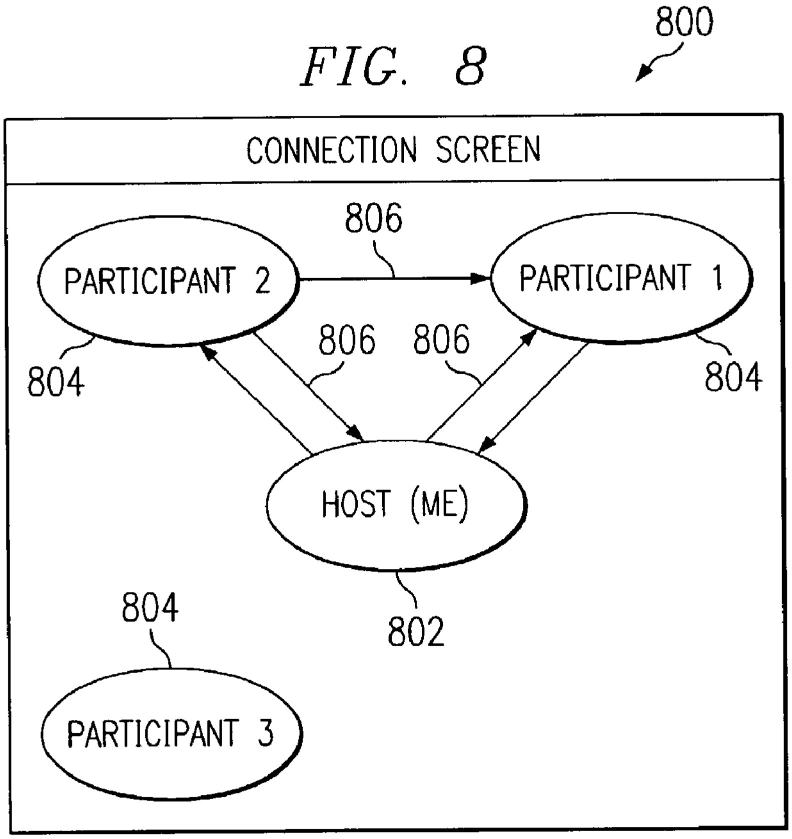
FIG. 8 is an illustration of the connection screen of the present invention.

FIG. 8 is another screen displayable on the graphical user interface. Connection screen 800 is a graphical summary of the parties involved in the conference call and the flow of information between parties as allowed by host 802. Host 802 is displayed in the center with other participants 804 displayed around him. Information arrows 806 display the flow of information between the participants. As can be seen in participant information section 740, participant 1 is muted with respect to the party on line 3 (participant 2). Therefore, information arrows 806 indicate that participant 2 can send information to participant 1 (i.e. participant 1 can hear participant 2), but participant 1 cannot send information to participant 2 (i.e. participant 2 cannot hear participant 1). The host can fully communicate with participant 1, so information arrows 806 show that information can be sent both direction between participant 1 and the host. Information can also be sent both ways between participant 2 and the host. Participant 3 is excluded from the conference call, so there are no information arrows going between participant 3 and any of the other participants.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Additionally, the steps of the present invention need not be implemented in the order disclosed herein. The novel spirit of the present invention is still embodied by reordering or deleting some of the steps contained in this disclosure. The spirit of the invention is not meant to be limited in any way except by proper construction of the following claims.

What is claimed is:

1. A method of using a computer to control communications between a plurality of participants in a conference calling center, the method comprising:

connecting a first participant and a second participant to a conference call within a conference calling center after identifying said first participant and said second participant; and applying an attribute to said first participant that restricts the ability of the first participant to communicate with the second participant in the conference call;

displaying, for each of the plurality of participants, including a host, a conference call graphical user interface having a participant information section and a message section;

wherein the attribute is applied only to the first participant and is not applied to a group or a pre-defined group designation;

wherein the participant information section contains a plurality of information regarding each participant and each participant's attributes;

wherein the message section includes a message screen, a recipient menu, a message data entry field, and a send button so that the host can send a written message to the first participant; and wherein a message sent by the host to the first participant is displayed on a first message screen of a first participant's graphical user interface and a message sent to the host from the first participant is displayed on a second message screen of a host's graphical user interface.

2. The method of claim 1 further comprising:

designating a host of said conference call; and wherein said host modifies said attribute dining the course of said conference call.

3. The method of claim 2 wherein said host designates another participant as the conference call host.

4. The method of claim 2 wherein said attribute excludes said first participant from said conference call until a specified time without using a conference bridge.

5. The method of claim 2 wherein said attribute excludes said first participant from said conference call until authorized by said host.

6. The method of claim 2 wherein said attribute mutes the first participant with respect to the second participant without using a conference bridge.

7. The method of claim 2 wherein said attribute excludes said first participant from connecting to said conference call until said host modifies said attribute to allow said first participant to connect to said conference call.

8. The method of claim 2 wherein said host modifies said attribute so that said first participant and said second participant can communicate in a private session.

9. The method of claim 1 wherein said attribute allows said first participant to send a private message to said second participant, so that a third participant is unable to read or hear the private message.

10. The method of claim 1 wherein the graphical user interface further comprises:

a general information section containing an information relevant to the conference call that will remain fixed for a duration of the conference call including a call in number, an administrative passcode, a participant passcode, a call tide, a start time, end a scheduled call end time.

11. The method of claim 1 wherein the graphical user interface further comprises:

a status information section containing a total number of conference call lines available, a number of conference call lines in use, and a call elapsed time.

12. An apparatus for controlling communications between plurality of participants in a conference calling center, the apparatus comprising:

programmable hardware;

software operable on said programmable hardware to connect a first participant and a second participant to a conference call within the conference calling center after identifying said first participant and said second participant; and apply an attribute to said first participant that restricts the ability of the first participant to communicate with the second participant in the conference call;

display a conference call graphical user interface having a participant information section and a message section:

wherein the attribute is applied only to the first participant and is not applied to a group or a pre-defined group designation;

wherein the participant information section contains a plurality of information regarding each participant and each attribute assigned to a participant:

wherein the message section includes a message screen a recipient menu, a message data entry field and a send button; and wherein a message sent by the host to the first participant is displayed on a first message screen of a first participant's graphical user interface and a message sent to the host from the first participant is displayed on a second message screen of a host's graphical use interface.

13. The apparatus of claim 12 wherein said software is further operable to:

modify said attribute during the course of said conference call.

14. The apparatus of claim 13 wherein said modification is the designation of another participant as a conference call host.

15. The apparatus of claim 13 wherein said modification is excluding said first participant from said conference call until a specified time.

16. The apparatus of claim 13 wherein said modification is excluding said first participant from said conference call until authorized by a host.

17. The apparatus of claim 13 wherein said modification is muting the first participant with respect to the second participant.

18. The apparatus of claim 13 wherein said modification is allowing said first participant to connect to said conference call.

19. The apparatus of claim 13 wherein said modification is the creation of a private session between said first participant and said second participant.

20. The apparatus of claim 12 wherein the software is further operable to send a message from said first participant to said second participant.

21. The method of claim 12 wherein the graphical user interface further comprises:

a general information section containing en information relevant to the conference call that will remain fixed for a duration of the conference call including a call in number, an administrative passcode, a participant passcode, a call title, a start time, and a scheduled call end time.

22. The method of claim 12 wherein the graphical user interface further comprises:

a status information section containing a total number of conference call lines available, a number of conference call lines in use, and a call elapsed time.

23. A conference call control computer program, encoded on a computer-readable medium, for controlling communications between participants in a conference calling center, the conference call control computer program comprising:

first instructions to cause a computer to connect a first participant and a second participant to a conference call within the conference calling center after identifying said first participant and said second participant; and second instructions to cause the computer to apply an attribute to said first participant so that the ability of the first participant to communicate with the second participant in the conference call is restricted;

third instructions to cause the computer to display a conference call graphical user interface having a participant information section and a message section:

whetein the attribute is not applied to a group or a pre-defined group designation;

wherein the participant information section contains a plurality of information about each participant and each participant's attributes;

wherein the message section includes a message screen, a recipient menu, a message data entry field and a send button so that the host can send a written message to a participant; and wherein a message sent by the host to the first participant is displayed on a first message screen of a first participant's graphical user interface and a message sent to the host from the first participant is displayed on a second message screen of a host's graphical user interface.

24. The control program of claim 23 further comprising:

third instruction to cause the computer to designate a host of said conference call; and fourth instructions to cause a computer to modify said attribute during the course of said conference call responsive to a first input from the host;

wherein the attribute is not a group object or a pre-defined group designation.

25. The control program of claim 24 further comprising fifth instruction to cause the computer to designate the first participant as the conference call host responsive to a second input from the host.

26. The control program of claim 24 wherein said modification is excluding said first participant from said conference call until a specified time without using a conference bridge.

27. The control program of claim 24 wherein said modification is excluding said first participant from said conference call until authorized by said host.

28. The control program of claim 24 wherein said modification is muting the first participant with respect to all other participants involved in said conference call without using a conference bridge.

29. The control program of claim 24 wherein said modification is muting the first participant with respect to the second participant without using a conference bridge.

30. The control program of claim 24 wherein said modification is allowing said first participant to connect to said conference call.

31. The control program of claim 24 wherein said modification is the creation of a private session between said first participant and said second participant.

32. The control program of claim 23 further comprising means for said first participant to send a message to said second participant.

33. The method of claim 23 wherein the graphical user interface further comprises:

a general information section containing a call in number, an administrative passcode, a participant passcode, a call title, a start time, and a scheduled call end time.

34. The method of claim 23 wherein the graphical user interface further comprises:

a status information section containing a total number of conference call lines available, a number of conference call lines in use, and a call elapsed time.

35. A computerized method for controlling communications between a plurality of participants in a conference call, the method comprising:

applying a default attribute to a first participant, wherein the default attribute is selected from a group of participant attributes displayed to a host and wherein the group of participant attributes comprises:

designating the host;

specifying a start time;

muting to a selected participant;

muting to all participants; and excluding from the conference call;

connecting the first participant to the conference call;

restricting the participation of the first participant in the conference call according to the default attribute;

notifying the host that the first participant has been connected to the conference call;

displaying the default attribute of the first participant to the host;

displaying a control interface to the host, the control interface comprising a field for displaying the group of participant attributes, wherein the group of participant attributes further comprises:

sending a message to a select participant; and allowing access to the conference call;

modifying the default attribute applied to the first participant by selecting a participant attribute from the group of participant attributes displayed In the control interface;

controlling the participation of the first participant in the conference call according to the modified default attribute;

wherein the default attribute is applied only to the first participant and is not applied to a group or a pre-defined group designation;

wherein the participant information section contains information regarding each of the participants and their attributes, arranged into rows and columns, with each row relating to a specific participant and each column relating to a different attribute of the specific participant:

wherein the message section includes message screen, a recipient menu, a message data entry field and a send button so that the host can send a written message to any one of the participants; and wherein a message sent by the host to the first participant is displayed on a first message screen of a first participant's graphical user interface and a message sent to the host from the first participant is displayed on a second message screen of a host's graphical user interface.

36. The method of claim 35 wherein the graphical user interface further comprises:

a general information section containing a call in number, an administrative passcode, a participant passcode, a call title, a start time, and a scheduled call end time.

37. The method of claim 35 wherein the graphical user interface further comprises:

a status information section containing a total number of conference call lines available, a number of conference call lines in use, and a call elapsed time.

* * * * *